Patented Feb. 9, 1926.

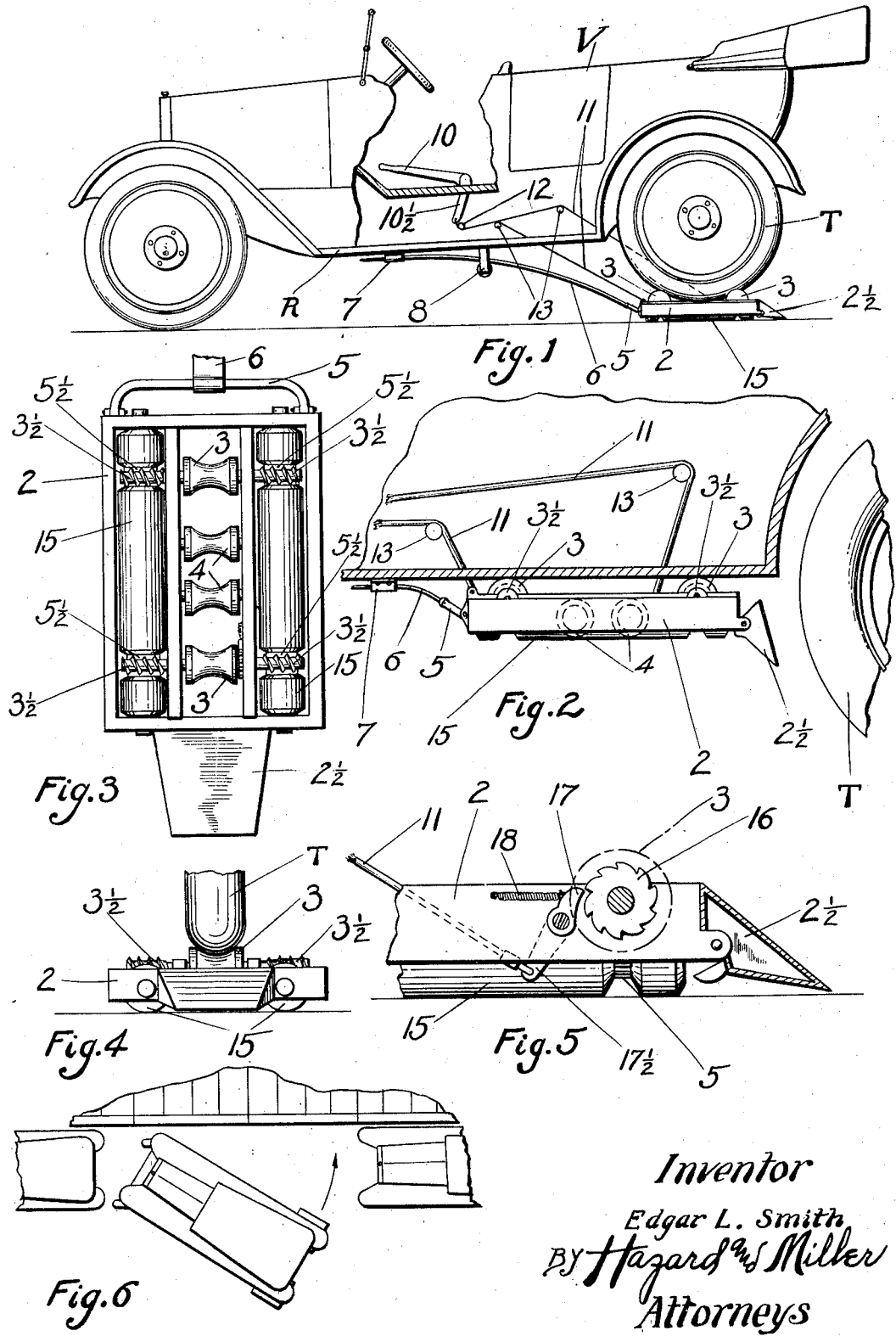

1,572,250

UNITED STATES PATENT OFFICE.

EDGAR L. SMITH, OF LOS ANGELES, CALIFORNIA.

AUTO PARKING DEVICE.

Application filed July 14, 1922. Serial No. 574,888.

*To all whom it may concern:*

Be it known that I, EDGAR L. SMITH, a citizen of the United States, residing at Los Angeles, in the county of Los Angeles and State of California, have invented new and useful Improvements in Auto Parking Devices, of which the following is a specification.

This invention relates to vehicle appliances, and more particularly to a means for facilitating "parking in" automobiles.

The driver of an automobile frequently desires to take up a position alongside of a curb or other location in between other machines lined up, and sometimes the remaining space between the adjacent automobiles from front to rear is so small that a machine cannot be worked in under its own power, however skillful the driver may be in manœuvring and parking. To that end, it is an object of the present invention to provide a simple means which may be provided as a part of the vehicle which is capable of being readily adjusted into such position with relation to the rear wheels that the same may be run onto the device or devices, and these will serve to swing or carry the rear end of the vehicle into the line of cars or in the parking space. It is an object to provide means which will enable the rear end of the car, while it is swung outwardly from the curb or parking space, to be elevated and then rolled in while the front end of the car may be standing in the parking space or line into which position it is readily driven preparatory to parking in.

Other objects will be made manifest in the following specification of an embodiment of the invention illustrated in the accompanying drawings, in which—

Figure 1 is a side elevation of a conventional form of vehicle with parts broken away and showing the parking device as applied.

Fig. 2 is a sectional detail view showing the parking device as elevated and concealed under the adjacent running board.

Fig. 3 is a plan of the parking device.

Fig. 4 is an end view of the device showing a tire in position thereon.

Fig. 5 is a side elevation and partial section indicating a drum holding means.

Fig. 6 is a diagrammatic view in plan showing the position of the car in a space preparatory to parking in.

The present device includes a substantial frame or carriage 2 having along its longitudinal medial line a set of drums 3 and intermediate idler drums 4 which, preferably, are concaved to correspond approximately to the tread of the tire of a vehicle wheel. The frame 2 is suitably connected as by a bail 5 at one end to a guide strip or strap 6, and this is slidably arranged upon any suitable and convenient portion as the running board R of a vehicle V. The strap member 6 is preferably flexible and its forward end is mounted in a guide member 7 behind which is a deep downwardly extending strap 8; the latter permitting the downward bending of the guide strap 6 as this is run rearwardly to lower the carriage 2 to the ground as shown in Fig. 1.

There is provided, preferably, one of the parking devices under each running board of the vehicle, and the devices are normally retracted to a position up under the running board by a hand or other lever 10 having an arm 10½ which is connected to flexible elements as small cables 11 which are guided around forward pulleys 12, and thence over rearward pulleys 13. The operative ends of the cables 11 are respectively attached to front and rear portions of the carriage frame 2 so that the latter can be lowered in a substantially horizontal position as the hand lever 10 is thrown forwardly. The device may gravitate to its lower position or be otherwise actuated in any suitable manner.

When it is desired to park the car it is run into the closest position in the parking space, for instance as in Fig. 6, with the front wheels close in, while the rear wheels are swung out. Just prior to stopping the car, the parking carriages 2 are released and dropped so that aprons 2½ thereof will rest on the ground just in front of the rear wheels, and since the carriages are moving rearwardly while the car is rolling forward slowly, the wheels will run up over the aprons and onto the longitudinally disposed set of rollers 3—4.

The carriage is provided with suitably constructed, arranged and formed rollers 15 having longitudinal axes and which form traction means on the engaged roadway. Thus, when the rear end of the car has been run up on the parking carriages, the rollers will enable the car to be rolled into line or parking space. Preferably, the carriage rollers 15 are power driven from the motor, and to that end suitable driving connections are provided between certain of the tire engaging drums and the lateral rollers 15.

Such means may comprise worms 3½ fixedly attached to the rollers 3 and which worms constantly mesh with worm wheels 5½ fixed to the rollers 15. Thus, when the tires T of the rear wheels engage the transmitting drums 3, the latter are power driven and the power is transmitted to the lateral rollers 15, and these serve to forcibly shift the carriages in a direction transverse to the longitudinal axis of the vehicle or into the parking space. As soon as the desired position has been reached, power is turned off and the parking carriages will be seen to be held fast in place by virtue of the transmitting gears.

When it is desired to leave the parking space, the rear wheels of the vehicle are reversed, and this reverses the direction of rotation of the power drums 3 and, therefore, turns the carriage rollers 15 so that the carriage will be propelled outwardly from the parking space. As soon as the rear end of the car has been shifted outwardly, then it is only necessary to latch the rearmost power drums 3 against rotation and, therefore, the rear tires will have traction effect and roll down off of the carriages.

This blocking of the power drums may be secured in any desired manner, and in the present case ratchet wheels 16 are provided on suitable of the power drums 3. These ratchet wheels are engageable by pawls 17 which may be thrown into effect by the pulling up tight of one of the cables 11 which is connected to a lever 17½ of each pawl 17. These cable sections 11, therefore, provide means not only for pulling the carriages back up into ineffective positions, but they also serve to lock the driving drums until the car is dismounted from the carriages. The locking pawls are normally held free by suitable means as springs 18.

Further embodiments, modifications and changes may be resorted to within the spirit of the invention as here claimed.

What is claimed is:

1. A parking device for motor vehicles adapted to be adjusted under the wheels of the vehicle comprising a carriage, a plurality of transverse drums, a plurality of rollers at right angles to the axes of the drums and positioned beyond the ends on the outside thereof, one of the end drums having a worm attached to each end of its axle and driving a worm on each of the rollers, a ratchet on one of the rollers, a dog engaging the ratchet, and a connection from the dog to the driver's seat whereby the dog may be operated to engage the ratchet and stop the rotation of the drum, hence stopping the lateral movement of the vehicle.

2. In combination with a vehicle, a carriage adapted to be lowered into positions contiguous to the wheel of the vehicle comprising flexible cables attached to the carriage, a lever mounted in the driver's compartment, and a strap attached to the carriage and engaging a pair of guide members underneath the running board, said lever being operated to raise or lower the carriage and the guide to position it under the running board, said strap being flexible and attached to the forward end of the carriage, whereby the carriage is drawn forwardly and upwardly underneath the running board.

In testimony whereof I have signed my name to this specification.

EDGAR L. SMITH.